United States Patent [19]

Plummer

[11] Patent Number: 4,992,824
[45] Date of Patent: Feb. 12, 1991

[54] APPARATUS AND METHOD UTILIZING AN LCD FOR PRINTING

[75] Inventor: William T. Plummer, Concord, Mass.

[73] Assignee: Polaroid Corporation, Cambridge, Mass.

[21] Appl. No.: 386,951

[22] Filed: Jul. 31, 1989

[51] Int. Cl.[5] .............................................. G03B 27/80
[52] U.S. Cl. ................................. 355/38; 350/331 R
[58] Field of Search ................. 355/1, 71, 38; 358/75; 350/331 R, 346, 339 R, 339 F; 346/107, 108

[56] References Cited

U.S. PATENT DOCUMENTS

| | | | |
|---|---|---|---|
| 4,161,363 | 7/1979 | Kahle | 355/68 |
| 4,264,921 | 4/1989 | Pennington et al. | 358/75 |
| 4,595,259 | 6/1986 | Perregaux | 350/331 R |
| 4,601,571 | 7/1986 | Yuasa et al. | 355/68 X |
| 4,805,012 | 2/1989 | Agostinelli et al. | 358/75 |

Primary Examiner—L. T. Hix
Assistant Examiner—D. Rutledge
Attorney, Agent, or Firm—Francis J. Caufield

[57] ABSTRACT

Method and apparatus which utilize an LCD modulator array for printing and/or enlarging an image recorded in a color film negative, a positive transparency or a color print, which LCD modulator array has pixels whose "closing time" (the time it takes to convert a pixel from a condition wherein it transmits radiation to a condition wherein it blocks radiation) is substantially longer than their "opening time" (the time it takes to convert a pixel from a condition wherein it blocks radiation to a condition wherein it transmits radiation). In accordance with the present invention, each pixel of the LCD modulator array is opened and closed in a rapid sequence, one after the other, at intervals which are much shorter than the closing time of the pixels of the LCD modulator array. The amount of radiation transmitted by each rapidly opened pixel is determined by detecting a spike of radiation which is transmitted through the rapidly opened pixel and by detecting and subtracting a background amount produced by radiation which is transmitted through other, slowly closing pixels.

16 Claims, 3 Drawing Sheets

APPARATUS AND METHOD UTILIZING AN LCD FOR PRINTING

BACKGROUND OF THE INVENTION

1. Field of the Invention

The present invention pertains to methods and apparatus which utilize an LCD modulator array for printing and/or enlarging an image recorded in a color film negative, a positive transparency, a color print or electronically.

2. Description of the Prior Art

A full color printer and/or enlarger which utilizes an LCD modulator array for printing and/or enlarging an image recorded in a color film negative, a positive transparency or a color print must scan the color film negative a number of times to acquire information about the images' chromanance and density. For example, once for each of three colors, to obtain a density value which is associated with each pixel (picture element) of the LCD modulator array. In practice, the scan time required to perform each scan can be quite long because of the response times of typical liquid crystal materials used in LCD modulator arrays. For example, FIG. 1 shows a response time curve for a typical LCD material. As one can readily appreciate, the "opening time" of a pixel in the LCD modulator array, i.e., the time it takes for the pixel in the LCD modulator array to convert from a state where less than or equal to about 1% of the radiation incident thereupon is transmitted to a state where over 90% of the radiation incident thereupon is transmitted, is typically about 0.1 ms and the "closing time" of the pixel in the LCD modulator array, i.e., the time it takes for the pixel in the LCD modulator array to convert from a state where over 90% of the radiation incident thereupon is transmitted to a state where less than or equal to about 1% of the radiation incident thereupon is transmitted, is typically about 20 ms. to 30 ms. Consequently, if one were to utilize even a coarse 64×64 pixel LCD modulator array in a printer and/or enlarger, the total opening time for the pixels of the LCD modulator array during each scan would be approximately 4 seconds and the total closing time for the pixels during each scan could be several minutes. Thus, a typical LCD modulator array utilized in a mode in which each pixel is opened and closed before the next succeeding pixel is opened and closed during each scan results in an extremely slow printer and/or enlarger.

Another additional problem associated with the use of an LCD modulator array for printing and/or enlarging an image recorded in, for example, a color film negative occurs because the pixels in an LCD modulator array are not completely opaque, even when completely closed. Specifically, because each pixel in a typical LCD modulator array is a leaky polarizer, an opacity problem occurs when an LCD modulator array is utilized for printing and/or enlarging. This opacity problem can be understood by considering a typical case where a closed pixel leaks about 1% of the radiation incident thereupon. For such a case, if the pixels of a 4000 pixel LCD modulator array were exposed, one at a time, for each of the three colors required to make a full color print, this would produce an unmodulated background exposure about forty times as great as the exposure which results from opening and closing a single pixel at any given time. Such a modulator would be almost ineffectual in varying the exposure locally in the print.

As one can readily appreciate from the above, there is a need in the art for method and apparatus which utilize an LCD modulator array for printing and/or enlarging an image recorded in a color film negative, a positive transparency, or a color print, which method and apparatus: (a) operate rapidly; (b) utilize an LCD modulator array which is comprised of pixels whose closing time plus opening time is approximately 30 milliseconds; and (c) achieve a modulation ratio of 10:1 (adequate for dodging applications) to 100:1 (adequate for printing a photograph from electronically stored information).

SUMMARY OF THE INVENTION

Embodiments of the present invention comprise method and apparatus which utilize an LCD modulator array for printing and/or enlarging an image recorded in a color film negative, a positive transparency, or a color print, which method and apparatus: (a) operate rapidly; (b) utilize an LCD modulator array which is comprised of pixels whose closing time plus opening time is approximately 30 milliseconds; and (c) achieve a modulation ratio of 10:1 (adequate for dodging applications) to 100:1 (adequate for printing a photograph from electronically stored information). In particular, in accordance with the present invention, each pixel of the LCD modulator array is opened and closed in a rapid sequence, one after the other, at intervals which are much shorter than the closing time of the pixels of the LCD modulator array. The amount of radiation transmitted by each opened pixel of the LCD modulator array is determined by detecting a spike of radiation which is transmitted through the rapidly opened pixel and by detecting and subtracting a background amount produced by radiation which is transmitted through other, slowly closing pixels. By referring to FIG. 1, one can see that: (a) a photosensor exposed to radiation transmitted by the LCD modulator array will provide a rapidly rising response when a pixel is opened and (b) the photosensor response will decay gradually, in accordance with the curve shown in FIG. 1 and the local density of, for example, the color film negative, when the pixel is subsequently closed. However, in accordance with the present invention, the tail-end information of the decaying photosensor response is unnecessary, and it is truncated by opening the next pixel in a sequence of pixels in the LCD modulator array to generate another rise in the photosensor response. As a result, a savings in time for a full scan may readily be a factor of 10 or 100.

In preferred embodiments of the present invention, the pixels of the LCD modulator array are opened and closed in response to signals provided by a controller means, and the radiation transmitted through the LCD modulator array and, for example, the color film negative, is detected by photosensor means. The controller converts the response from the photosensor means which is exposed to radiation transmitted by the LCD modulator array into: (a) a "background" sample of the radiation transmitted by the LCD modulator array before the controller sent a signal to cause a particular pixel in the LCD modulator array to be opened and (b) a "spike" sample of the radiation transmitted by the LCD modulator array after the controller sent a signal to cause the particular pixel to be opened. The controller then determines a measure of the amount of radiation transmitted by the particular pixel to be the difference between the "spike" sample corresponding to the level of the radiation received by the photosensor after the particular pixel was opened and the "background" sample corresponding to the level of radiation received by the photosensor before the particular pixel was opened. This amount of radiation is the amount of radiation which impinges upon the color film negative as a result of opening the particular pixel. The controller then examines the response from the photosensor means which is disposed to detect radiation transmitted by the color film negative. The controller converts this response into a "film" sample of the radiation transmitted by the color film negative at the time the "spike" sample is taken, i.e., after the particular pixel was opened. The "film" samples of radiation transmitted by the color film negative are stored for later use during printing and/or enlarging.

As explained above, a pixel of the LCD modulator array is not completely opaque, even when fully closed. As a result, to prevent dilution of the modulating action, the inventive method and apparatus which utilizes an LCD modulator array for printing and/or enlarging an image recorded in, for example, a color film negative operates as follows. All the pixels in the LCD modulator array are opened at once and each one is closed by a controller, when it has produced the required exposure appropriate for its local area of the color film negative.

Although we have described the present invention in terms of LCD modulator arrays having a small opening time and a relatively large closing time, it should be clear to those of ordinary skill in the art that LCD modulator arrays which are comprised of pixels having a small closing time and a relatively long opening time may be utilized to provide embodiments of the present invention in a manner which is analogous to the above-described embodiments. In addition, it should be clear to those of ordinary skill in the art that such LCD modulator arrays may be fabricated by rotating the direction of polarization of polarizers which comprise the LCD modulator arrays.

DESCRIPTION OF THE DRAWINGS

The novel features that are considered characteristic of the present invention are set forth with particularity herein, both as to their organization and method of operation, together with other objects and advantages thereof, and will be best understood from the following description of the illustrated embodiments when read in connection with the accompanying drawings wherein.

DETAILED DESCRIPTION

Figure 2:
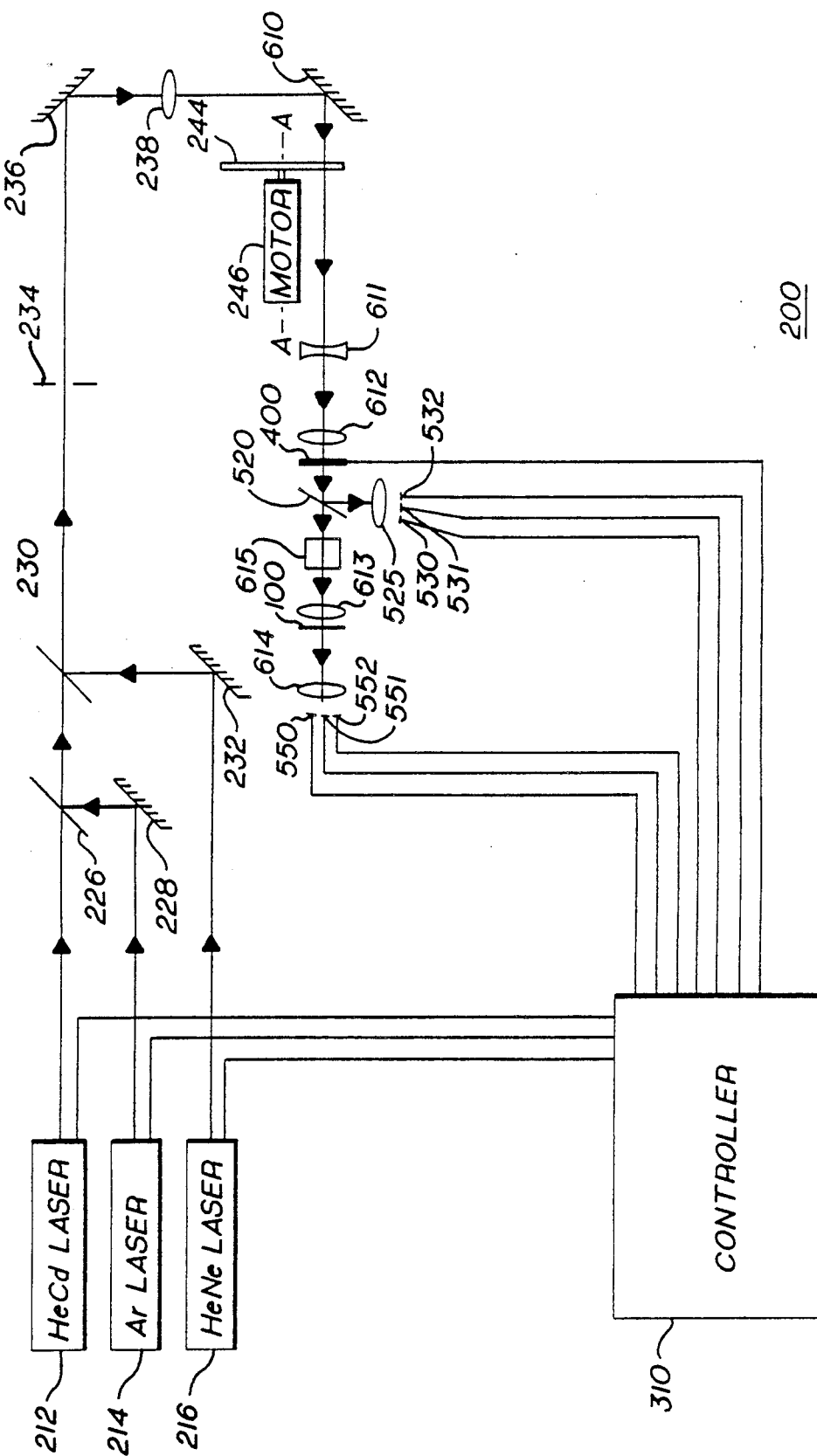
FIG. 2 shows, in pictorial form, an apparatus fabricated in accordance with the present invention for determining appropriate radiation exposures for printing and/or enlarging an image recorded in a color film negative.

FIG. 2 shows an embodiment of an apparatus for determining appropriate radiation exposures for printing and/or enlarging an image recorded in color film negative 100 in accordance with the present invention. Before describing the operation of apparatus 200 in detail we will first describe the operation of apparatus 200 in general.

In succession, radiation from each of three laser sources, for example, red, green and blue radiation, impinges upon and is transmitted through LCD modulator array 400 and then through color film negative 100. LCD modulator array 400 is comprised of liquid crystal pixels which can be opened to transmit radiation and closed to block radiation. As will be explained in detail below, the pixels of LCD modulator array 400 are sequentially opened and closed at a rapid rate, i.e., at intervals which are much shorter than the closing time of the pixels of the LCD modulator array. The radiation in each beam which is transmitted by the pixels of LCD modulator array 400 and by color film negative 100 is measured, and the measurements are stored by controller 310. Controller 310 then determines the relative contributions of red, green and blue radiation in the original exposure which produced the image recorded in each area of color film negative 100 which is sequentially illuminated by each beam. Controller 310 makes this determination by comparing the measurements of red, green and blue radiation which were transmitted through each area of color film negative 100 after passing through LCD modulator array 400. These relative contributions of red, green, and blue radiation in the original exposure are used, in a manner which is well known to those of ordinary skill in the art, to calculate appropriate pixel exposure times for LCD modulator array 400 for the red, green, and blue radiation so that illumination of color film negative 100 through LCD modulator array 400 will produce the appropriate color exposure of a copy film.

Referring now to FIG. 2, apparatus 200 is comprised of three coherent laser radiation sources 212, 214, and 216. Laser radiation source 212 comprises a helium-cadmium laser for providing a beam of blue radiation, laser radiation source 214 comprises an argon laser for providing a beam of green radiation, and laser radiation source 216 comprises a helium-neon laser for providing a beam of red radiation.

Blue laser radiation from laser source 212 passes through dichroic mirror 226, through dichroic mirror 230 and aperture 234. Green laser radiation from laser source 214 is directed to dichroic mirror 226 by reflecting surface 228. Dichroic mirror 226 directs the green laser radiation to dichroic mirror 230 and thence to aperture 234. Red laser radiation from laser source 216 is directed to dichroic mirror 230 by reflecting surface 232 and thence to aperture 234.

Laser sources 212, 214 and 216 are energized in succession, in response to signals from controller 310, and the laser radiation from each is directed through aperture 234 which blocks unwanted diffracted orders. After passing through aperture 234, the laser radiation from laser sources 212, 214, and 216, respectively, is reflected from reflecting surfaces 236 and 610 and is then transmitted through ground or frosted glass 244 which is rotatably driven about axis AA by motor 246. Ground glass 244 changes the laser radiation from coherent radiation to incoherent radiation to eliminate any speckle effect which is normally associated with coherent laser radiation.

The spot of radiation projected onto ground glass 244 is thereafter broadened by non-achromatic negative lens 611 and, together with thin, non-achromatic, positive field lens 612, provides a beam which encompasses LCD modulator array 400. A first portion of the radiation transmitted by LCD modulator array 400 is deflected by beamsplitter 520 and focused by positive lens 525 onto red, blue and green photosensors 530, 531, and 532, respectively, and a second portion of the radiation transmitted by LCD modulator array 400 is projected upon color film negative 100 by copy lens 615 and thin, non-achromatic, positive field lens 613. An enlarging lens may be used in place of copy lens 615 if an enlargement of the image recorded in color film negative 100 is being made. The radiation transmitted by color film negative 100 is focused by positive print lens 614 onto red, green, and blue color photosensors 550, 551, and 552, respectively. In practice, photosensors 530–532 and photosensors 550–552 ought to be so close together, respectively, that the photosensors in each group individually respond uniformly to information anywhere in LCD modulator array 400 and color film negative 100, respectively.

The pixels of LCD modulator array 400 are opened and closed in a rapid sequence in response to signals provided by controller 310, one after the other, at intervals which are much shorter than the closing time of the pixels of the LCD modulator array.

Each trio of photosensors, i.e., photosensors 530, 531, and 532 and photosensors 550, 551, and 552, provides analog electronic information signals corresponding to the intensity of the particular color radiation transmitted thereto. The electronic information signals output from each trio of photosensors are amplified by amplifiers in controller 310 (not shown) in a manner which is well known to those of ordinary skill in the art and, thereafter, they are converted from analog signals to digital signals by analog-to-digital converters in controller 310 (not shown) in a manner which is also well known to those of ordinary skill in the art.

Controller 310 converts the response from photosensors 530, 531, and 532 into: (a) a "background" sample of the radiation transmitted by LCD modulator array 400 before controller 310 sent a signal to LCD modulator array 400 to cause a particular pixel thereof to be opened and (b) a "spike" sample of the radiation transmitted by LCD modulator array 400 after controller 310 sent a signal to LCD modulator array 400 to cause the particular pixel to be opened. Controller 310 then determines a measure of the amount of radiation transmitted by the particular pixel to be the difference between the "spike" sample corresponding to the level of the radiation received by photosensors 530, 531, and 532 after the particular pixel was opened and the "background" sample corresponding to the level of radiation received by photosensors 530, 531, and 532 before the particular pixel was opened. This amount of radiation is the amount of radiation which impinges upon color film negative 100 as a result of opening the particular pixel. Note that the specific times at which the "spike" sample and the "background" sample are taken for a particular type of LCD material are determined in accordance with methods well-known to those of ordinary skill in the art.

Next, controller 310 converts the response from photosensors 550, 551, and 552 into a "film" sample at the time the "spike" sample is taken, i.e., after the particular pixel was opened. The "film" sample is the radiation transmitted by color film negative 100 when the particular pixel was open. Controller 310 stores the "film" samples of radiation transmitted through color film negative 100 for later use during printing and/or enlarging.

Figure 1:
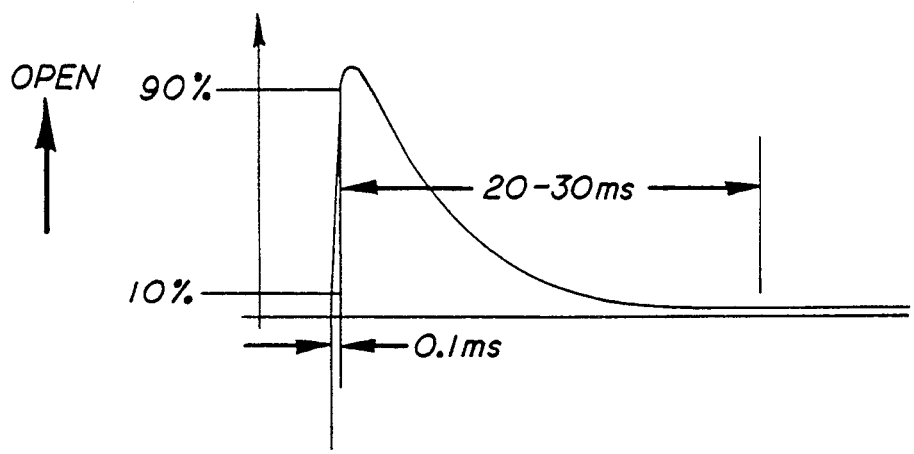
FIG. 1 shows, in graphical form, a response time curve for a typical LCD material.
Figure 4:
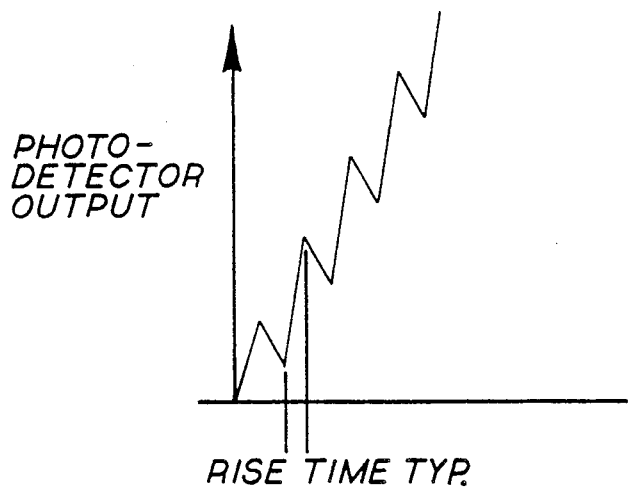
FIG. 4 shows, in graphical form, the response of a photodetector disposed to detect radiation transmitted by the LCD modulator array shown in FIG. 2.
Figure 5:
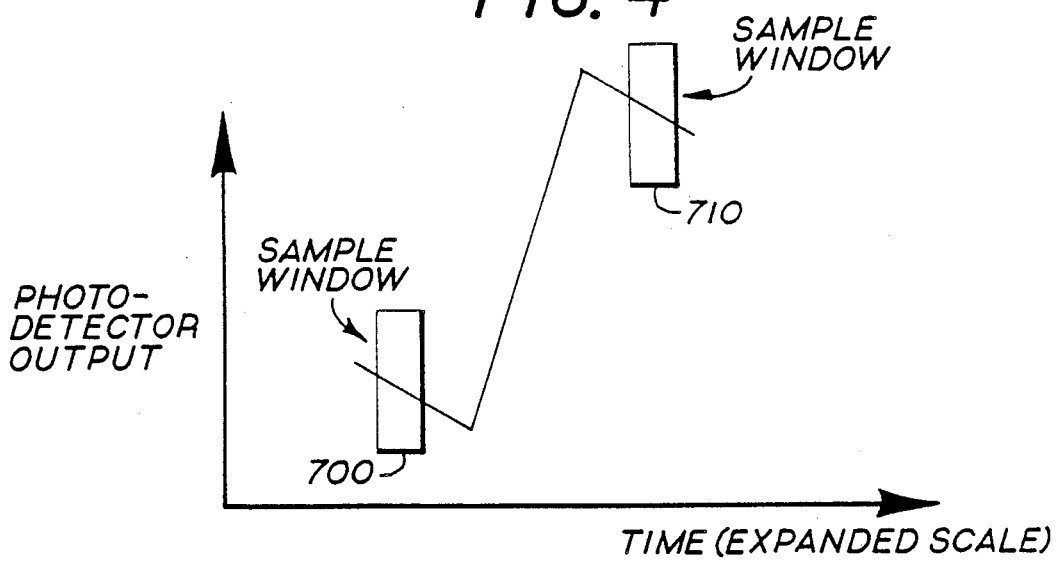
FIG. 5 shows, in graphical form, a method of sampling the photodetector response curve of FIG. 4 for use in fabricating the apparatus shown in FIG. 2.

In sum, controller 310 sends signals to LCD modulator array 400 to cause each pixel thereof to be opened and closed in a rapid sequence, one after another, at intervals which are much shorter than the closing time of the pixels. As shown by FIG. 1, the transmittance of a pixel which is closed after being opened decays slowly and, as a result, the response of a photodetector, such as photodetector 530, 531, or 532 of FIG. 2, is roughly as shown in FIG. 4. As one can readily appreciate from this, as each pixel is opened, a spike appears which rides above a background. This information is used, in accordance with the present invention, when controller 310 converts the response of photodetectors 530, 531, and 532 into samples at two sample windows, which sample windows are shown for illustrative purposes in FIG. 5. The first sample, "background" sample 700, is taken before controller 310 sent a signal to LCD modulator array 400 to cause it to open a particular pixel. This occurs at a predetermined time after controller 310 sent a signal to LCD modulator array 400 to cause it to close the pixel which had previously been opened in the sequence. "Background" sample 700 provides an indication of the background radiation transmitted by LCD modulator array 400. The second sample, "spike" sample 710, is taken after controller 310 sent a signal to LCD modulator array 400 to cause it to open the particular pixel. Due to the fast opening time of the pixel, as indicated by FIG. 1, "spike" sample 710 provides an indication of the radiation transmitted by the particular pixel.

Lastly, controller 310 determines the relative contributions of red, green and blue radiation in the original color exposure which produced the image recorded in each area of color film negative 100 which is sequentially illuminated by each beam. Controller 310 makes this determination by comparing the measurements of the red, green and blue radiation which were transmitted through each area of color film negative 100 after passing through LCD modulator array 400. These relative contributions of red, green, and blue radiation in the original exposure are used, in a manner which is well known to those of ordinary skill in the art, to calculate appropriate pixel exposure times for LCD modulator array 400 for the red, green, and blue radiation so that illumination of color film negative 100 through LCD modulator array 400 will produce the appropriate color exposure of copy film 300. In addition, it should be understood that certain types of picture quality enhancement, by means of methods well known to those of ordinary skill in the art, such as, for example, dodging, may be used to determine appropriate amounts of radiation for transmission through the various pixels of LCD modulator array 400 to produce predetermined enhancements.

Figure 3:
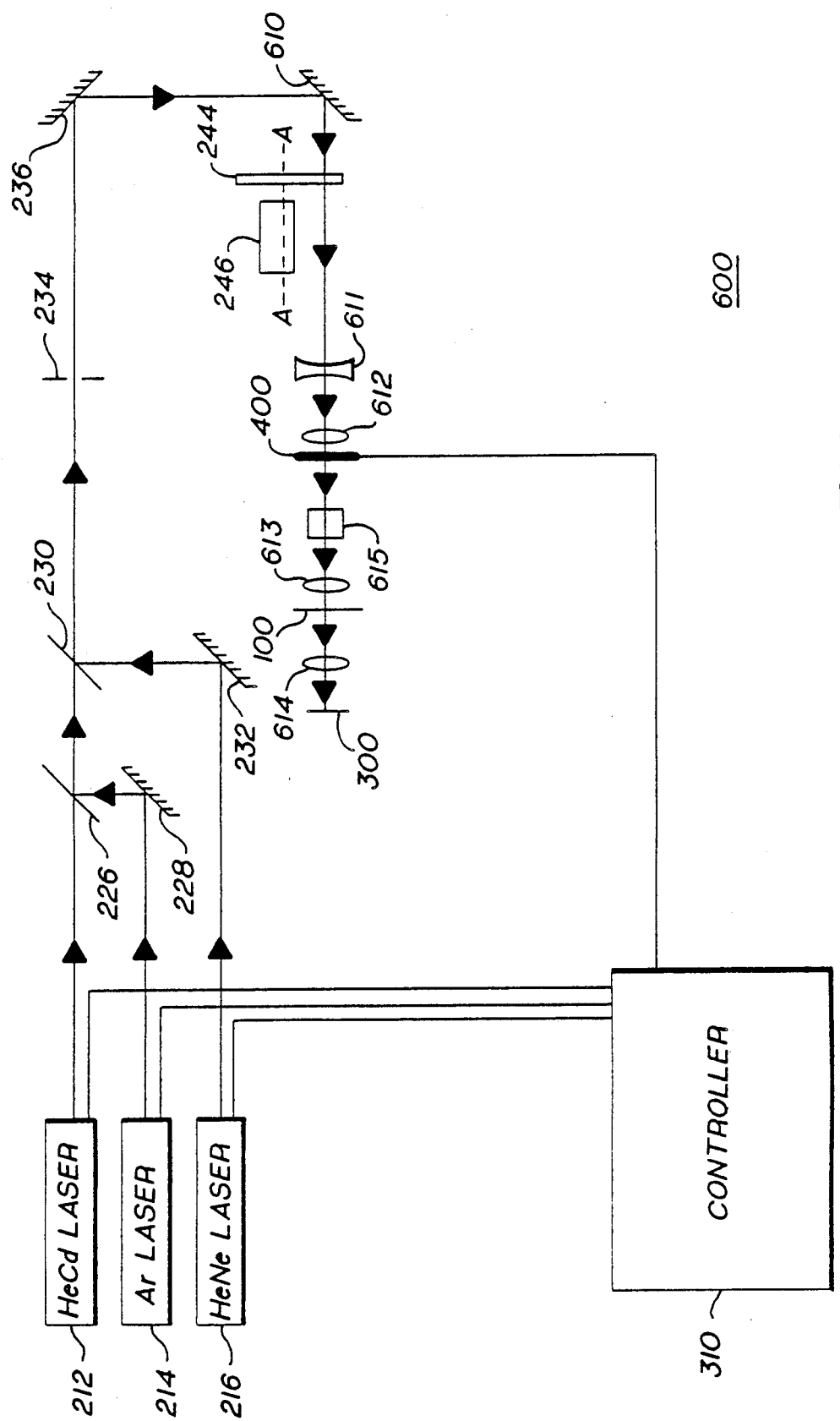
FIG. 3 shows, in pictorial form, an apparatus fabricated in accordance with the present invention for printing and/or enlarging an image recorded in a color film negative using radiation exposures determined by the apparatus shown in FIG. 2.

Referring now to FIG. 3, there is shown generally at 600 an embodiment of an apparatus for printing and/or enlarging an image recorded in color film negative 100, which embodiment uses radiation exposures determined and stored by controller 310 of apparatus 200 shown in FIG. 2. Before describing the operation of apparatus 600 in detail, its operation first will be described in general.

The pixels comprising LCD modulator array 400 are all opened. Then, in succession, radiation from each of the three laser sources impinges upon and is transmitted through LCD modulator array 400 and color film negative 100 to strike color film 300. For each of the beams of radiation, the pixels of LCD modulator array 400 are closed at predetermined times, under the control of controller 310, in accordance with the measurements and calculations made as a result of using apparatus 200 shown in FIG. 2, to ensure that the exposure of color film 300 is substantially the same as that which produced the image recorded in color film negative 100.

The portions of apparatus 200 and 600 which are denoted by the same numbers are the same, and they operate in the manner described above in regard to apparatus 200, except for certain additional features of controller 310.

Laser sources 212, 214 and 216 are energized in succession, in response to signals from controller 310, and the laser radiation from each is directed through aperture 234 in the manner described above with regard to apparatus 200 shown in FIG. 2. After passing through aperture 234, the laser radiation from laser sources 212, 214, and 216, respectively, is reflected from reflecting surfaces 236 and 610 for transmission through ground glass 244.

The spot of radiation projected onto ground glass 244 is thereafter broadened by non-achromatic negative lens 611 and, together with thin, non-achromatic, positive field lens 612, provides a beam which encompasses LCD array modulator array 400. The radiation transmitted by LCD modulator array 400 is projected onto color film negative 100 by copy lens 615 and thin, non-achromatic, positive field lens 613. An enlarging lens may be used in place of copy lens 615 if an enlargement of the image recorded in color film negative 100 is being made. The radiation transmitted by color film negative 100 is focused by positive print lens 614 onto color film 300 to expose it to make a print or an enlargement.

The pixels of LCD modulator 400 are activated in response to signals provided thereto by controller 310. In particular, at the beginning of the exposure to each beam of radiation from a source, the pixels comprising LCD modulator array 400 are all opened. Then, the pixels of LCD modulator array 400 are individually addressed and closed in response to signals provided at predetermined times by controller 310, in accordance with the measurements and calculations described above with regard to apparatus 200 shown in FIG. 2, to ensure that exposure of color film 300 is substantially the same as that which produced the image stored in color film negative 100. One means for achieving this individual control of the pixels is to scan the entire array electronically at a normal television rate or faster so that the "open" command is repeated at an interval shorter than the liquid crystal closing time.

Other embodiments of the invention, including additions, subtractions, deletions and other modifications of the preferred disclosed embodiments of the invention will be obvious to those skilled in the art and are within the scope of the following claims. For example, embodiments of the present invention may use non-laser sources of radiation. In addition, the LCD modulator array 400 of the apparatus shown in FIG. 2 may be of such a high resolution that the information provided by controller 310 may be used to print or enlarge the image in the color film negative without using the color film negative as shown in FIG. 3. For example, in such an embodiment, instead of controller 310 calculating the appropriate pixel exposure times for LCD modulator array 400 for the red, green and blue radiation so that illumination of color film negative through LCD modulator array 400 will produce the appropriate color exposure of copy film 300 as described above for the embodiment shown in FIG. 3, in an embodiment which prints without using the negative, controller 310 calculates appropriate pixel exposure times for LCD modulator array 400 for the red, green, and blue radiation so that illumination of LCD modulator array 400 alone will produce the appropriate color exposure of copy film 300. In such embodiments, the information relating to the image may be stored electronically, for example, on video tape. In addition, such embodiments advantageously permit the information relating to the image to be transmitted electronically, for example, by data links, and permit the image to be printed without having to use the color film negative.

Further, it should be clear to those of ordinary skill in the art that embodiments of the present invention may be utilized to print and/or enlarge an image recorded in a color film negative, a positive transparency or a color print. In addition, controller 310 may also be used to provide variations of exposure to take into account well-known variations in development techniques or well known variations in film development characteristics.

Still further, although we have described the present invention in terms of LCD modulator arrays having a small opening time and a relatively large closing time, it should be clear to those of ordinary skill in the art that LCD arrays which are comprised of pixels having a small closing time and a relatively long opening time may be utilized to provide embodiments of the present invention in a manner which is analogous to the above-described embodiments. In addition, it should be clear to those of ordinary skill in the art that such LCD modulator arrays may be fabricated by rotating the direction of polarization of polarizers which comprise the LCD modulator arrays.

Yet still further, it should be clear to those of ordinary skill in the art that the apparatus of FIGS. 2 and 3 can be adapted to means for contact printing.

What is claimed is:

1. Apparatus for determining exposure levels for printing or enlarging an image recorded in a medium, said apparatus comprising:
   an LCD modulator array consisting of a plurality of liquid crystal pixels each of which has an open state for transmitting radiation incident thereto and a closed state for blocking radiation incident thereto;
   means for irradiating said LCD modulator array with at least one color or light;
   first photosensor means disposed for detecting at least a portion of the radiation transmitted by said LCD modulator array;
   second photosensor means disposed for detecting at least a portion of the radiation which impinges upon and is affected by the medium; and
   controller means for:
   (a) sending signals to the LCD modulator array to cause said pixels to open and close in sequence, one at a time, at a rate which is faster than the larger of the opening or closing time of said pixels; and (b) receiving responses from said first and second photosensor means.

2. The apparatus of claim 1 wherein said controller means further includes means for sending signals to said LCD modulator array to cause particular pixels to selectively open and close and for converting the responses from said first photosensor means into:
  (a) a "background" sample of radiation transmitted by said LCD modulator array before said controller means sends a signal for a particular pixel to open or close, and
  (b) a "spike" sample of radiation transmitted by said LCD modulator array after said controller means sent a signal to cause a particular pixel to open or close.

3. The apparatus of claim 2 wherein said controller means determines a measure of the amount of radiation which is transmitted by said LCD modulator array by the particular pixel from said "background" sample and said "spike" sample.

4. The apparatus of claim 3 wherein said controller means converts the response from said second photosensor means at the time of said "spike" sample into a "film" sample of radiation affected by the medium.

5. The apparatus of claim 4 wherein said controller means determines the exposure which produced the image recorded in the medium in the areas of the medium that were exposed to radiation transmitted by said pixels of the LCD modulator array.

6. The apparatus of claim 5 which further comprises storage means wherein said controller means stores, for each pixel of said LCD modulator array, the time required to produce the exposure of a color film which will print or enlarge the image when radiation from said radiation means is transmitted thereto after being transmitted by said LCD modulator array and being affected by the medium.

7. The apparatus of claim 5 further comprising storage means wherein said controller means stores, for each pixel of said LCD modulator array, the time required to produce the exposure of radiation of a color film which will print or enlarge the image when radiation from said radiation means is transmitted thereto after being transmitted by said LCD modulator array.

8. The apparatus of claim 3 wherein the medium is a color film negative and the closing time of said LCD pixels is larger than the opening time.

9. Apparatus for determining exposures for printing or enlarging an image recorded in a medium, said apparatus comprising:
  an LCD modulator array, being comprised of a multiplicity of liquid crystal pixels, for transmitting at least a portion of the radiation which impinges thereon;
  at least one source of radiation for generating at least one beam of radiation which impinges upon said LCD modulator array;
  means for directing at least a portion of the radiation which is transmitted by said LCD modulator array to impinge upon the medium;
  first photosensor means disposed for detecting at least a portion of the radiation transmitted by said LCD modulator array;
  second photosensor means disposed for detecting at least a portion of the radiation which impinges upon and is affected by the medium; and
  controller means for:
    (a) sending signals to said LCD modulator array to cause the pixels of said LCD modulator array to open and close or close and open in sequence, one at a time, at a rate which is faster than the larger of the opening or closing time of the pixels; and
    (b) receiving responses from said first and second photosensors.

10. Apparatus for printing or enlarging an image recorded in a medium, said apparatus comprising:
  an LCD modulator array, being comprised of a multiplicity of liquid crystal pixels, for transmitting at least a portion of radiation which impinges thereon, a portion of the transmitted radiation impinging upon and being affected by the medium;
  at least one source of radiation for generating at least one beam of radiation which impinges upon said LCD modulator array;
  controller means for:
    (a) sending signals to said LCD modulator array to open all the pixels thereof if the closing time is larger than the opening time;
    (b) retrieving from a storage means, for each pixel of the LCD modulator array, the open time required to produce the exposure of radiation of a color film which will print or enlarge the image when radiation from the source is transmitted thereto through said LCD modulator array and is affected by the medium; and
    (c) sending a signal to said LCD modulator array to cause the pixels to be closed when said open time has been reached for each.

11. Apparatus for printing or enlarging an image recorded in a film negative, said apparatus comprising:
  an LCD modulator array, being comprised of a multiplicity of liquid crystal pixels, for transmitting at least a portion of radiation which impinges thereon;
  at least one source of radiation for generating at least one beam of radiation which impinges upon said LCD modulator array;
  controller means for:
    (a) sending signals to said LCD modulator array to open all the pixels thereof if the closing time is larger than the opening time;
    (b) retrieving from a storage means, for each pixel of said LCD modulator array, the open time required to produce the exposure of radiation of a color film which will print or enlarge the image when radiation from the source is transmitted thereto through said LCD modulator array; and
    (c) sending a signal to said LCD modulator array to cause the pixels to be closed when said open time has been reached for each.

12. A method for determining radiation exposures for printing or enlarging an image recorded in a medium, said method comprising the steps of:
  directing radiation through an LCD modulator array comprised of a multiplicity of liquid crystal pixels;
  detecting at least a portion of the radiation transmitted by said LCD modulator array;
  opening and closing or closing and opening the pixels of said LCD modulator array in sequence, one at a time, at a rate which is faster than the larger of the opening or closing time of the pixels;
  directing at least a portion of the radiation transmitted by said LCD modulator array to impinge upon the medium;

detecting at least a portion of the radiation affected by the medium; and determining the radiation exposures from the portions of radiation detected.

13. A method for printing or enlarging an image recorded in a medium, said method comprising the steps of:

opening all the pixels of an LCD modulator comprised of a multiplicity of liquid crystal pixels if the closing time is larger than the opening time;

directing radiation to impinge upon the LCD modulator array;

directing at least a portion of the radiation transmitted by the LCD modulator array to impinge upon the medium; and closing the pixels of the LCD modulator array when a sufficient time has passed to produce the exposure of radiation of a color film which will print or enlarge the image when radiation from the source is transmitted thereto through the LCD modulator array and is affected by the medium.

14. The method of claim 13 wherein at least two of the pixels are simultaneously open to minimize the overall time required for exposure.

15. A method for printing or enlarging an image recorded in a medium, said method comprising the steps of:

opening all the pixels of an LCD modulator comprised of a multiplicity of liquid the closing time is larger than the opening time;

directing radiation to impinge upon the LCD modulator array;

closing the pixels of the LCD modulator array when a sufficient time has passed to produce the exposure of radiation of a color film which will print or enlarge the image when radiation from the source is transmitted thereto through the LCD modulator array.

16. The method of claim 15 wherein at least two of the pixels are simultaneously open to minimize the overall time required for exposure.

* * * * *